United States Patent Office.

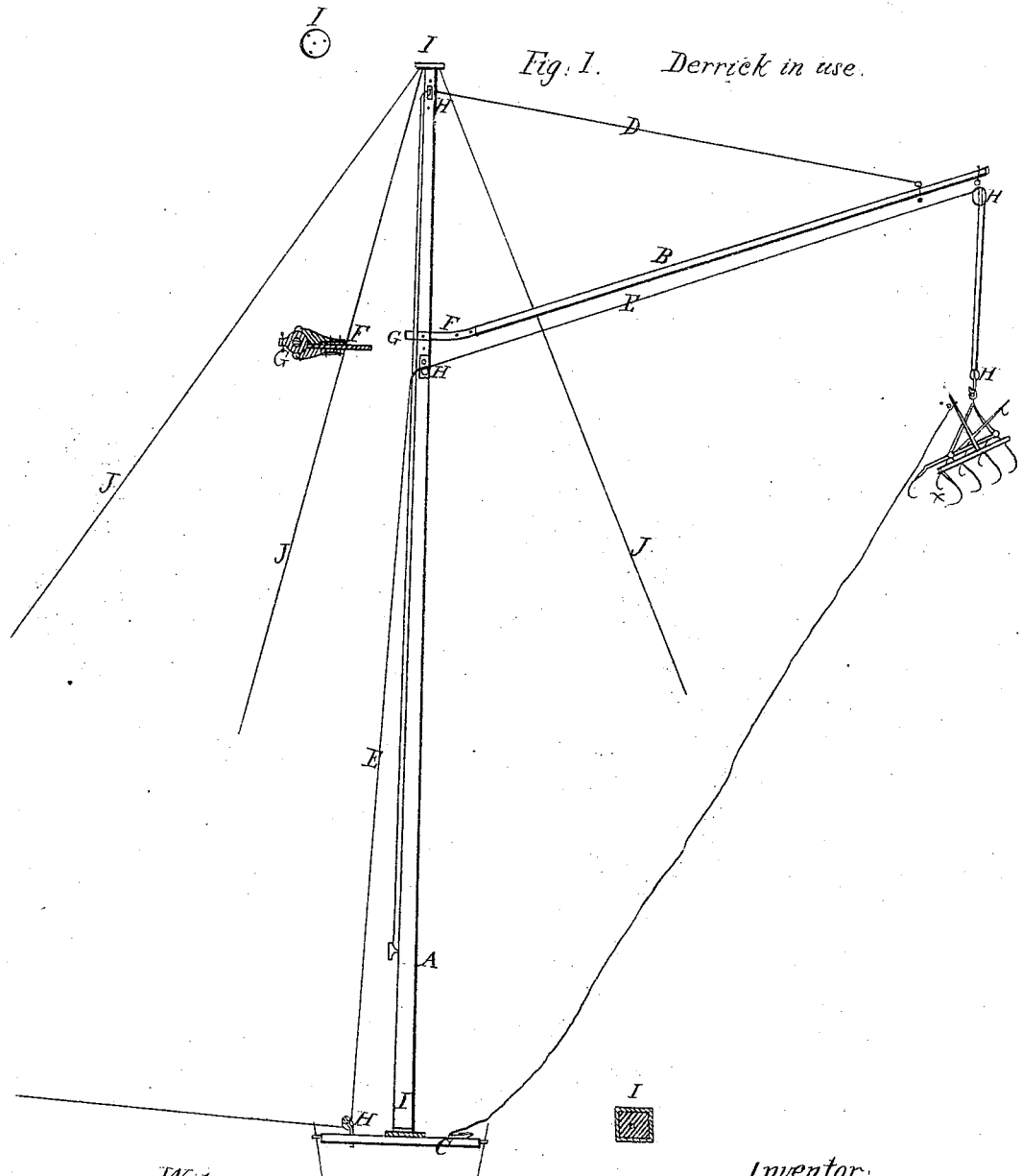

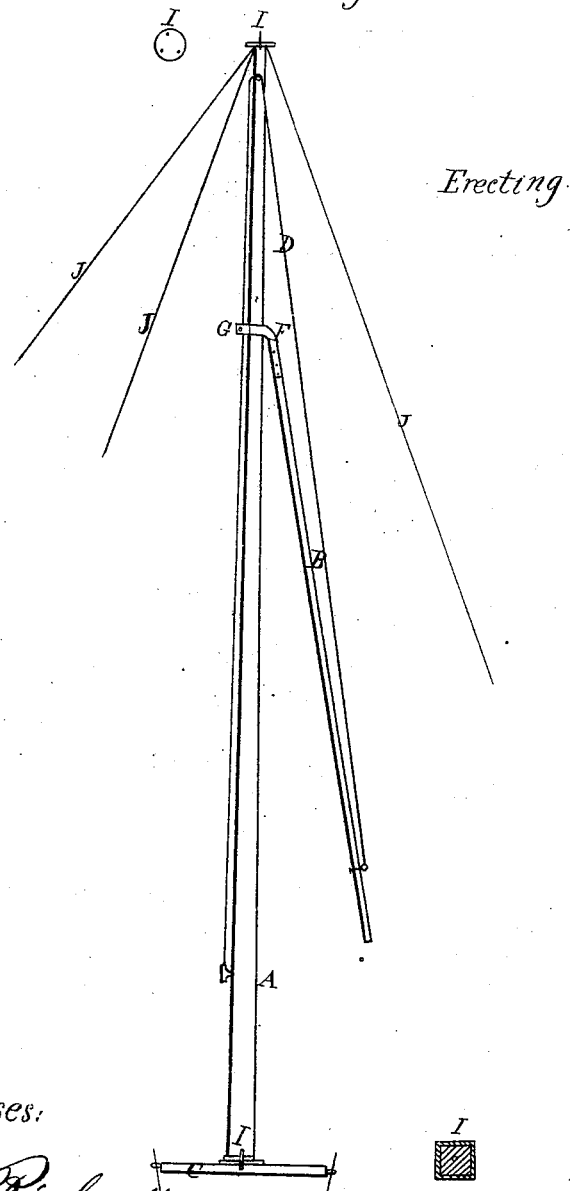

ISAAC J. HATTABOUGH, OF SANTA CLARA COUNTY, CALIFORNIA.

Letters Patent No. 71,749, dated December 3, 1867.

---

IMPROVEMENT IN FIELD-DERRICK.

---

*The Schedule referred to in these Letters Patent and making part of the same.*

---

TO WHOM THESE PRESENTS SHALL COME:

Be it known that I, ISAAC J. HATTABOUGH, of the county of Santa Clara, State of California, have invented a new and useful Improvement in "Field-Derricks," of which the following description and accompanying drawings are an exact and clear description.

The purposes of my improvement are to form a derrick of the simplest kind, and of such strength and rig as to make the ability to erect and capacity to use within the scope of the most ordinary farm-laborer; also to enable its being used in elevating and transporting hay or grain to a greater distance than any other of as simple construction. It is formed of one upright pole about thirty feet long, six inches at the base, four inches at the top, with an arm eighteen feet long, three by four inches in size. The foot-blocks may be five feet long, in size four by five inches, fastened to the ground by two stakes passing through two straps at the end. The guy-ropes are each about seventy feet in length, one and one-quarter inch in size, and are three in number; the working-ropes are one inch in diameter. The bottom of the pole is shod with a steel plate, through which passes a pin into the pole, and also passes through a steel plate on the foot-block, forming a pivot for the action of the pole or derrick. On the top of the pole is a pin, upon which acts the guy-plate. About one-third down from the top of the pole is a collar with two eyes, which clasps the pole in any position it may be placed, and to which is attached the arm, which is furnished with a seat-cap of wood and metal, having two hooks to hitch upon the eyes of the collar. Upon the main pole, below this collar, and also below the guy-plate, are notched into the pole, on opposite sides, recesses for the sheaves to work in, the upper one for the arm-guide, the lower one for two sheaves for the hoisting-rope to pass between, to hold and work steadily to prevent chafing and wear—an important item in the construction and working a derrick of this form, as the wear and chafing of a constant-running rope are, if otherwise operated, very material. The arm is operated by the guide-rope, passing from the end of the arm, where it is fastened to an eye-bolt, through and over the sheave at the top of the pole, and down to the cavel. The working-rope is fastened to the fork or the object to be lifted, and then passes to the double-sheave block at the end of the arm; then through the sheaves below the collar on the pole, down to the block attached to the foot-block, and to where the power is attached.

I claim to use a lighter pole and longer arm than can be used by any other form of derrick. The notched pieces that cover the sheaves are bolted to the pole. The brace and working-ropes being on opposite sides of the pole, act in combination to brace the same, making this stronger, easier of adjustability, simpler action upon its pivoted centre, greater sweep of arm, and of fewer complications than are found in any derrick used for the purposes claimed.

Figure 1 is the derrick erected.
Figure 2 is the derrick erecting.

A is the pole; B the arm; C the footing; D, adjusting-rope; E, operating-rope; J J J, guys; G, collar; H, sheaves or blocks; I, pivots and plates; K is the fork; L, guide-line.

*Claim.*

I claim—
1. The double sheaves for the operating-line.
2. I claim the pivots and plates at top and bottom of the pole, for the guys and pole-swivel.
3. I claim the combination of the sheaves H with the pivots to plates I I, in combination with operating-rope E, pole A, arm B, adjuster D, guys J, to make a simple and complete combination for a derrick for field purposes, as described, and substantially as set forth.

ISAAC J. HATTABOUGH.

Witnesses:
JAS. ALEX. FORBES, Jr.,
ALFRED R. WOODHAMS,
J. M. BILLINGS.